Sept. 15, 1953 N. E. WEEKS 2,652,088
MANUFACTURE OF ARTICLES, SUCH AS VALVED BAGS, MADE
OF WATERPROOF LAMINATED FABRIC
Filed Dec. 31, 1947 2 Sheets-Sheet 1
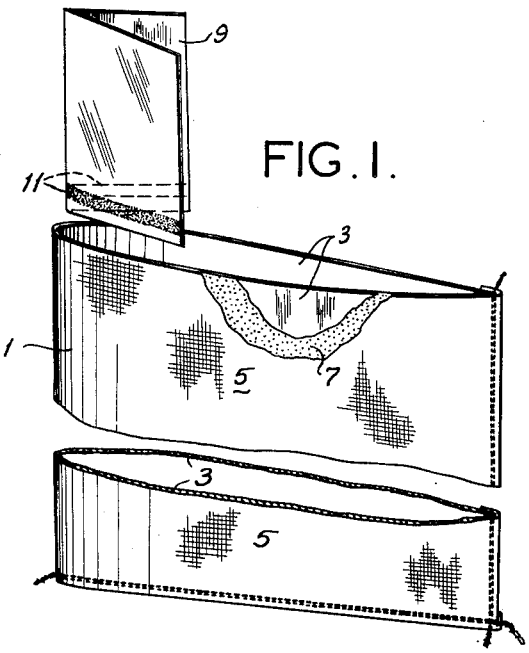
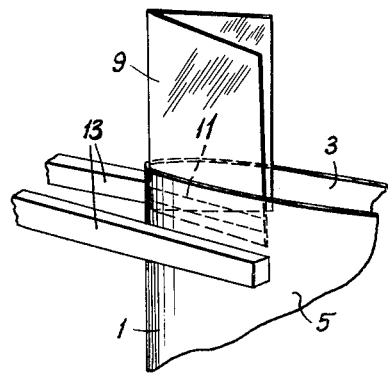
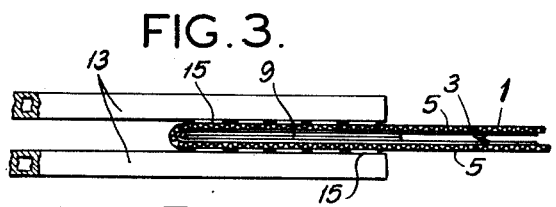
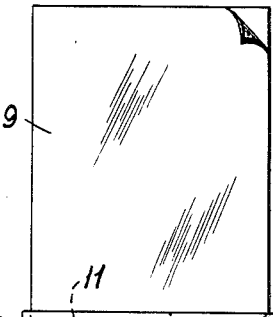
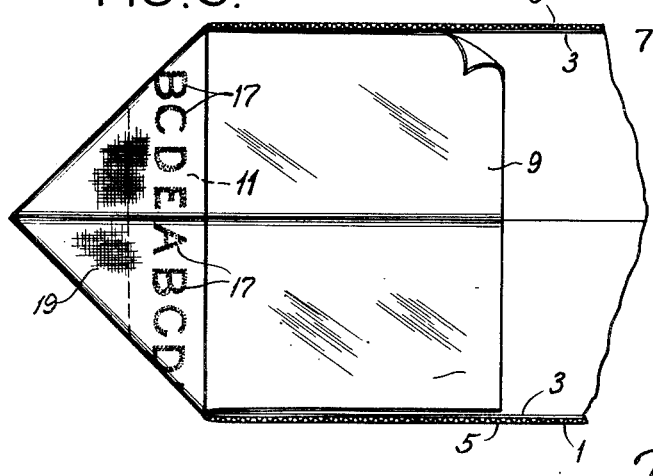
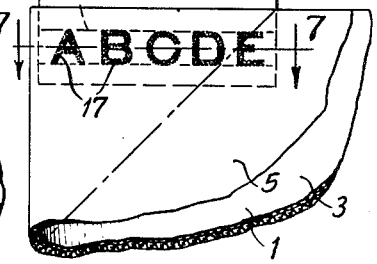
Norman E. Weeks,
Inventor.
Haynes and Koenig
Attorneys.

Sept. 15, 1953 N. E. WEEKS 2,652,088
MANUFACTURE OF ARTICLES, SUCH AS VALVED BAGS, MADE
OF WATERPROOF LAMINATED FABRIC
Filed Dec. 31, 1947 2 Sheets-Sheet 2

Norman E. Weeks,
Inventor.
Haynes and Koenig,
Attorneys.

Patented Sept. 15, 1953

2,652,088

UNITED STATES PATENT OFFICE 2,652,088

MANUFACTURE OF ARTICLES, SUCH AS VALVED BAGS, MADE OF WATERPROOF LAMINATED FABRIC

Norman E. Weeks, Normandy, Mo., assignor to Bemis Bro. Bag Company, St. Louis, Mo., a corporation of Missouri Application December 31, 1947, Serial No. 794,830

10 Claims. (Cl. 150—9)

1

This invention relates generally to the manufacture of laminated fabrics of the type having a waterproofing adhesive laminant, and more particularly to the improvement of valved bags made of such material, the improvement being made concurrently with the adhesive securing of valve sleeves to such bags.

Among the several objects of the invention may be noted the provision of a simple method of imprinting laminated fabric utilizing its laminant as the printing fluid and the provision of the resulting article; the provision of an improved article (bag or the like) composed of layers adhesively secured by a laminant such as asphalt, to which a valve sleeve or the like is heat sealed; the provision of articles of the class described wherein ordinarily disadvantageous smudging by bleeding of the laminant during heating is converted into an advantageous imprint serving useful purposes; the provision of a process for simply producing an improved article simultaneously with the step of heat sealing thereto an auxiliary piece; and the provision more particularly of a valved, laminated, waterproof bag imprinted in accordance with the process of the invention in such manner as to provide a trade-mark or like indicia within the tucked-in valve flap of the bag. Other objects will be in part apparent and in part pointed out hereinafter.

The invention accordingly comprises the elements and combinations of elements, steps and sequence of steps, features of construction and manipulation, and arrangements of parts which will be exemplified in the structures and methods hereinafter described, and the scope of the application of which will be indicated in the following claims.

In the accompanying drawings, in which one of various possible embodiments of the invention is illustrated, Fig. 1 is a perspective view illustrating a preliminary step in carrying out the process of this invention as applied to valved bags;

Fig. 2 is a fragmentary perspective view illustrating a succeeding step;

Fig. 3 is an enlarged fragmentary plan view of Fig. 2 but illustrating a succeeding step in the process;

Fig. 4 is a fragmentary side elevation of a bag printed and provided with a valve sleeve in accordance with this invention, prior to tucking in of a valve flap and the valve sleeve;

Fig. 5 is a fragmentary plan view of the mouth end of the bag illustrating the valve flap and

Figure 6:
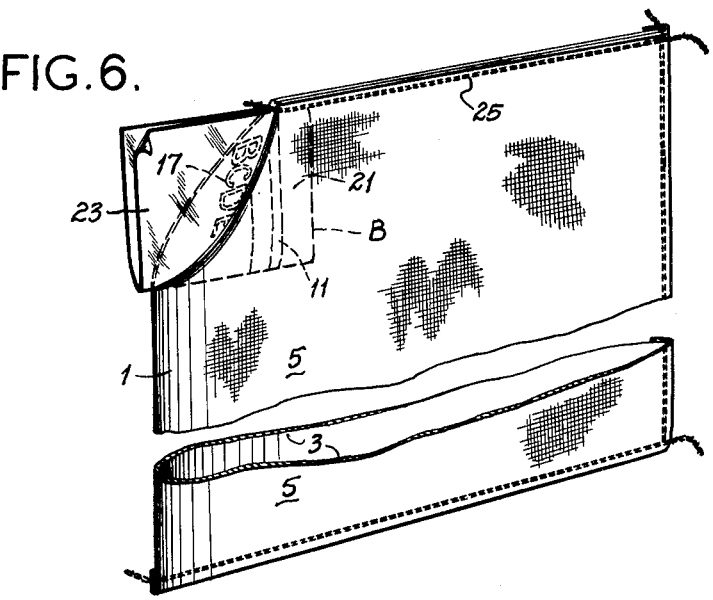
Figure 7:
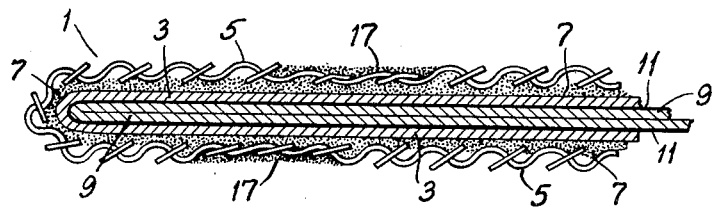

2 valve sleeve tucked in, the mouth of the bag being spread open;

Fig. 6 is a perspective view of the completed valve bag; and,

Fig. 7 is an enlarged section taken on line 7—7 of Fig. 4.

Similar reference characters indicate corresponding parts throughout the several views of the drawings.

This invention generally relates to the printing of laminated fabric having an outermost layer of porous, or fibrous sheet material, such as cloth or paper, which is bonded to the next adjacent layer of the fabric by an adhesive laminant consisting of asphalt or the like. Such a laminant has the usually undesirable characteristic of bleeding through the porous outer layer of the fabric when it is heated sufficiently to melt it, thereby staining the outer surface of the outer layer. I have found that this usually undesirable characteristic of the laminant may be utilized to advantage for printing any desired marking upon the outer surface of the outer layer of the fabric. Printing is accomplished by locally heating the laminant throughout a limited area or limited areas corresponding in outline to the marking or markings which it is desired to print upon the fabric. This melts the localized area or areas of the laminant, the melted laminant thereupon bleeding through the outer porous layer of the fabric and staining it. The outline of the resultant stain or stains is in the configuration of the desired marking or markings to be printed. In the case of a valved bag the imprint is placed at an advantageous location in the valve flap.

Heating the laminant over the localized area or areas for printing purposes is readily accomplished by pressing a heated type bar against the outer layer of the fabric. The type faces of the type bar melt portions of the laminant over areas corresponding in outline to the outline of the type faces. The melted laminant is absorbed in the outer layer and bleeds completely through the outer layer to form stains on its outer surface having the outline of the type faces. It will be understood that the laminant is of a contrasting color with respect to the outer layer of the fabric so that the stain or stains resulting from its bleeding through the outer layer are visibly apparent. When the melted laminant cools, it hardens and sets in the desired outlines for marking purposes. The stain or stains resulting from the bleeding of the laminant are permanent and have a reasonably sharp outline.

Thus, marking of the fabric with any desired characters is accomplished by a printing process utilizing the laminant itself as a printing fluid.

The invention is particularly applicable to the manufacture of valved bags in conjunction with the heat sealing of valve sleeves in such bags, see for example the bag illustrated in my copending application entitled Valved Bag, Serial No. 772,642, now Patent No. 2,517,068, filed September 8, 1947. Referring to the drawings, which illustrate the invention in its application to the manfacture of valved bags, there is shown at 1 a bag made of waterproof laminated fabric. The fabric has inner and outer layers 3 and 5, respectively, bonded by an adhesive laminant 7 consisting of a layer of asphalt. The inner layer 3 may be of paper, such as creped kraft paper, or any other suitable sheet material. The outer layer 5, as herein illustrated, is of cloth, such as burlap. The bag is provided with a valve sleeve 9 comprising a generally rectangular sheet of any suitable flexible sheet material, such as creped kraft paper. The valve sleeve 9 is prepared with a stripe 11 of a thermoplastic adhesive adjacent one of its ends and is initially folded as illustrated in Fig. 1 with the adhesive on the outside. The folded valve sleeve is inserted in a corner at the mouth of the bag to dispose the stripe 11 of adhesive against that portion of the bag fabric immediately adjacent the mouth of the bag, as illustrated in Fig. 2.

The corner of the bag is then clamped between a pair of heated bodies or bars 13 having any desired type faces 15 thereon, with the type faces engaging the outer surface of the bag fabric in line with the stripe 11 of adhesive on the folded valve sleeve (Fig. 3). The heated type bodies apply heat and pressure to melt the stripe 11 of adhesive and cause the sleeve to become adhesively secured to the bag fabric. At the same time the type faces 15 locally heat the asphalt 7 over localized areas corresponding in outline to the outline of the type faces. The melted asphalt bleeds through the outer burlap layer 5 to stain the outer surface of the layer with asphalt according to the outline of the type faces. The bag is clamped between the heated bars 13 for a length of time sufficient to activate the adhesive 11 and melt the asphalt 7, but not so long as to allow random bleeding of the asphalt. Upon removal of bars 13, the stains resulting from the bleeding of the asphalt appear as printing 17 on the bag at the corner of the bag to which the valve sleeve 9 is secured (Figs. 4 and 5). Fig. 7 illustrates in section how the asphalt has been absorbed in the burlap and how it extends completely through the burlap to form stains on the outer surface of the bag having the outlines of the desired markings therefor.

To complete the valved bag, the corner of the bag and the valve sleeve 9 are tucked into the mouth of the bag as illustrated in Fig. 5. This forms a tucked-in valve flap 19 from which the valve sleeve extends into the mouth of the bag. The valve sleeve is secured to the inside of the inner margin of the valve flap by the thermoplastic adhesive 11, and becomes reversely folded in respect to its folded condition of Fig. 4. The sleeve is folded back upon itself on a fold line B (Fig. 6) so as to have a portion 21 extending into the bag and a portion 23 extending from within the valve flap 19 out of the bag. The mouth of the bag is then closed by stitching a top seam 25 which also secures together the upper margins of the folded sides of the sleeve 9 so that it forms, in effect, a tube through which a filling spout may be inserted. Further details of this general type of valve may be had in my aforesaid copending application, now Patent No. 2,517,068.

The above-described process of manufacturing valved bags not only avoids meaningless and undesirable stains such as would be produced by flat heat sealing members, but it enables the bag manufacturer to print his name, trade-mark or the like on the bag concurrently with the operation of heat sealing the valve sleeve to the bag. Thus, it eliminates any necessity for a separate printing operation for this purpose. By ultilizing the laminant as a staining agent, it eliminates necessity for printing ink. The location of the name, trade-mark or the like resulting from the process is advantageous in that the markings are printed at the inner margin of the valve flap 19 where they are normally substantially concealed, so as not to interfere or cause confusion with any brand name, trade-mark or the like that the purchaser of the bag may have printed thereon for designating the source of its contents. The markings, however, may be readily inspected by anyone seeking to ascertain the identity of the manufacturer of the bag or other information afforded by the marking.

In view of the above, it will be seen that the several objects of the invention are achieved and other advantageous results attained.

As many changes could be made in the above methods and constructions without departing from the scope of the invention, it is intended that all matter contained in the above description or shown in the accompanying drawings shall be interpreted as illustrative and not in a limiting sense.

I claim:

1. The process of printing laminated material having an outer layer of porous sheet material forming the printing surface which is to be exposed to view, which layer is bonded to the next adjacent layer by a laminant of contrasting color with respect to said outer layer and adapted upon melting to bleed through the pores of the outer layer, comprising locally heating the laminant over a localized area corresponding in outline to desired indicia to be printed sufficiently to melt a portion of the laminant over said area, whereby the melted laminant bleeds through said outer layer and stains its outer surface in the outline of said indicia.

2. The process of printing laminated waterproof fabric having an outer layer of fibrous sheet material forming the printing surface which is to be exposed to view, which layer is bonded to the next adjacent layer of the fabric by a layer of asphalt, comprising locally heating the asphalt over localized areas corresponding in outline to the desired marking to be printed to melt portions of the asphalt over said areas, whereby the melted asphalt bleeds through the fibrous material and stains its outer surface in the outline of said marking.

3. The process of printing laminated waterproof fabric consisting of a layer of cloth which is to be exposed to view and which is bonded to a layer of paper by a layer of asphalt, comprising locally heating the asphalt over localized areas corresponding in outline to the desired marking to be printed to melt portions of the asphalt over said areas, whereby the melted asphalt bleeds through the cloth and stains its outer surface in the outline of said marking.

4. The process of printing laminated waterproof fabric consisting of a layer of cloth which is to be exposed to view and which is bonded to a layer of paper by a layer of asphalt, comprising pressing heated type faces against the cloth layer locally to heat the asphalt over areas corresponding in outline to the type faces to melt portions of the asphalt over said areas, whereby the melted asphalt bleeds through the cloth and stains its outer surface in the outline of said type faces.

5. The method of adhesively affixing a valve sleeve within the mouth of a bag by means of a thermoplastic adhesive and concurrently printing the outside of the bag, the latter being of laminated bag fabric having an outer layer of porous sheet material bonded to an inner layer by a waterproofing laminant adapted to bleed through the outer layer when melted, comprising applying heat and pressure to the bag and sleeve over a localized area corresponding in outline to a desired marking to be printed, thereby to activate the adhesive and melt a portion of the laminant over said area, the melted laminant bleeding through the outer layer and staining its outer surface in the outline of said marking.

6. The process of adhesively affixing a valve sleeve within the mouth of a bag by means of a thermoplastic adhesive and concurrently printing the outside of the bag, the latter being of laminated bag fabric having an outer layer of fibrous material bonded to an inner layer by a layer of asphalt, comprising applying heat and pressure to the bag and sleeve over localized areas corresponding in outline to the desired marking to be printed, thereby to activate the adhesive and melt portions of the asphalt over said areas, the melted asphalt bleeding through the outer layer and staining its outer surface in the outline of said marking.

7. The method of adhesively affixing a valve sleeve within the mouth of a bag by means of a thermoplastic adhesive and concurrently printing the outside of the bag, the latter consisting of an outer layer of cloth bonded to an inner layer of paper by a layer of asphalt, comprising applying heat and pressure to the bag and sleeve over localized areas corresponding in outline to a desired marking to be printed, thereby to activate the adhesive and melt portions of the asphalt over said areas, the melted asphalt bleeding through the outer layer and staining its outer surface in the outline of said marking.

8. The method of adhesively affixing a valve sleeve within the mouth of a bag by means of a thermoplastic adhesive and concurrently printing the outside of the bag, the latter consisting of an outer layer of cloth bonded to an inner layer of paper by a layer of asphalt, comprising pressing heated type faces against the cloth layer and sleeve thereby to activate the adhesive and melt portions of the asphalt over localized areas corresponding in outline to the type faces, the melted asphalt bleeding through the cloth and staining its outer surface in the outline of said type faces.

9. A valved bag formed of waterproof laminated bag fabric having an outer layer of porous sheet material bonded to an inner layer by a waterproofing laminant adapted to bleed through the outer layer when melted, the porous layer constituting the outside of the bag, said bag having a tucked-in valve flap extending into its mouth, and a valve sleeve of flexible sheet material heat sealed to the inside of the inner margin of the valve flap by a thermoplastic adhesive, a portion of the laminant in the inner margin of the valve flap being absorbed in the outer layer over an area corresponding in outline to a desired marking for the bag and extending completely through the outer layer to form a stain on its outer surface having the outline of said marking, and the valve sleeve being heat sealed over an area coextensive with the stained area of the porous layer.

10. A valved bag formed of waterproof bag fabric consisting of an outer layer of cloth bonded to an inner layer of paper by a layer of asphalt, the cloth constituting the outside of the bag, said bag having a tucked-in valve flap extending into its mouth, and a valve sleeve of flexible sheet material heat sealed to the paper at the inner margin of the valve flap by a thermoplastic adhesive, a portion of the asphalt in the inner margin of the valve flap being absorbed in the cloth over an area corresponding in outline to a desired marking for the bag and extending completely through the cloth to form a stain on its outer surface having the outline of said marking, and the valve sleeve being heat sealed to the paper over an area coextensive with the stained area of the cloth.

NORMAN E. WEEKS.

References Cited in the file of this patent

UNITED STATES PATENTS

| Number | Name | Date |
|---|---|---|
| 231,672 | Jefferies | Aug. 31, 1880 |
| 1,107,879 | Bates | Aug. 18, 1914 |
| 1,754,769 | Redington | Apr. 15, 1930 |
| 1,855,919 | McKee | Apr. 26, 1932 |
| 1,874,427 | Billings | Aug. 30, 1932 |
| 2,048,895 | Rosen | July 28, 1936 |
| 2,200,971 | Sonneborn et al. | May 14, 1940 |
| 2,294,796 | Moulder | Sept. 1, 1942 |
| 2,298,592 | Rowe | Oct. 13, 1942 |
| 2,367,367 | Olson | Jan. 16, 1945 |
| 2,383,598 | Glidden | Aug. 28, 1945 |
| 2,446,414 | Farrell et al. | Aug. 3, 1948 |
| 2,474,619 | Farrell et al. | June 25, 1949 |
| 2,489,210 | Weeks | Nov. 22, 1949 |

FOREIGN PATENTS

| Number | Country | Date |
|---|---|---|
| 808,721 | France | Nov. 21, 1936 |